(12) United States Patent
Woolstencroft

(10) Patent No.: US 7,384,225 B2
(45) Date of Patent: Jun. 10, 2008

(54) FIXING COVER

(75) Inventor: David Harold Woolstencroft, Lancashire (GB)

(73) Assignee: Matrice Material Systems Limited, Lancashire (GB)

( * ) Notice: Subject to any disclaimer, the term of this patent is extended or adjusted under 35 U.S.C. 154(b) by 0 days.

(21) Appl. No.: 10/496,974

(22) PCT Filed: Nov. 18, 2002

(86) PCT No.: PCT/GB02/05207

§ 371 (c)(1),
(2), (4) Date: Dec. 22, 2004

(87) PCT Pub. No.: WO03/048592

PCT Pub. Date: Jun. 12, 2003

(65) Prior Publication Data

US 2005/0105986 A1    May 19, 2005

(30) Foreign Application Priority Data

Dec. 1, 2001 (GB) ................................. 0128820.8

(51) Int. Cl.
*F16B 37/14* (2006.01)
(52) U.S. Cl. .................................... 411/372.6; 411/431
(58) Field of Classification Search ........ 411/429–431, 411/372.5–377, DIG. 2
See application file for complete search history.

(56) References Cited

U.S. PATENT DOCUMENTS

| 1,046,973 | A | * | 12/1912 | Christie ...................... 110/323 |
| 2,103,743 | A | * | 12/1937 | Doty ........................... 292/327 |
| 2,582,580 | A | * | 1/1952 | Bedford, Jr. ................. 411/520 |
| 3,007,726 | A | * | 11/1961 | Parkin ......................... 403/372 |
| 3,905,411 | A |   | 9/1975 | Dzus et al. |
| 4,890,967 | A | * | 1/1990 | Rosenbaum ................ 411/377 |
| 5,082,409 | A | * | 1/1992 | Bias ........................... 411/431 |
| 5,163,797 | A |   | 11/1992 | Patti |
| 5,707,113 | A |   | 1/1998 | Russell |
| 5,791,848 | A | * | 8/1998 | Lanham ...................... 411/373 |
| 5,810,532 | A |   | 9/1998 | Huang |
| 6,142,579 | A |   | 11/2000 | Thiel |

FOREIGN PATENT DOCUMENTS

WO    WO 00/60246 A    10/2000

* cited by examiner

*Primary Examiner*—Flemming Saether
(74) *Attorney, Agent, or Firm*—Venable LLP; Michael A. Sartori; Steven J. Schwarz

(57) ABSTRACT

A bolt head cover (10) comprises an outer heat resistant portion (12) and an inner gripping portion (14). The bolt head cover (10) is arranged to be placed over the bolt head (16). The bolt head cover (10) is retained in position by means of the inner gripping portion (14) which grips the bolt head, with the gripping portion (14) being retained in the heat resistant portion (12) by means of flanges (18).

11 Claims, 1 Drawing Sheet

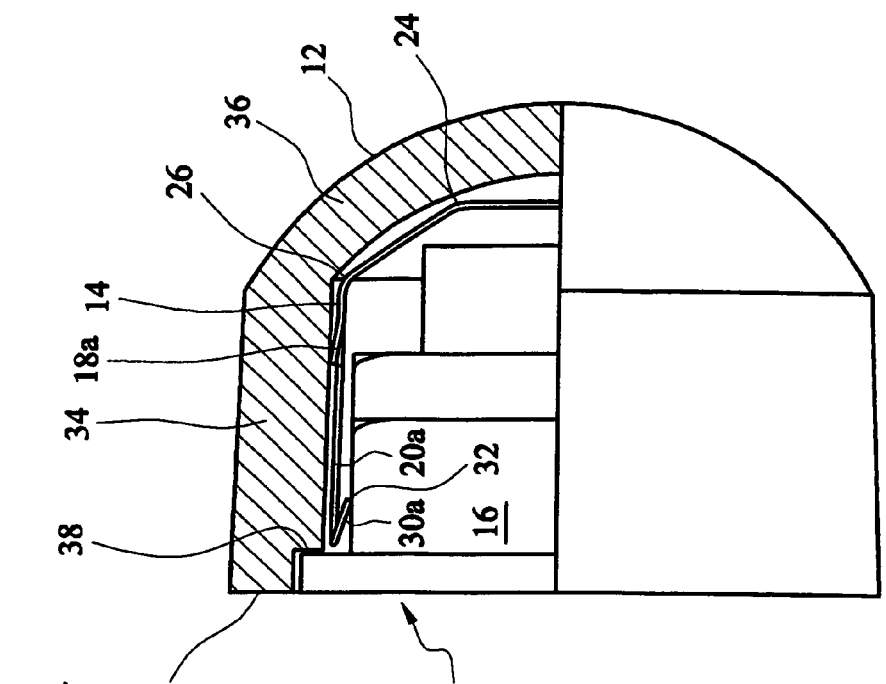
FIG. 1
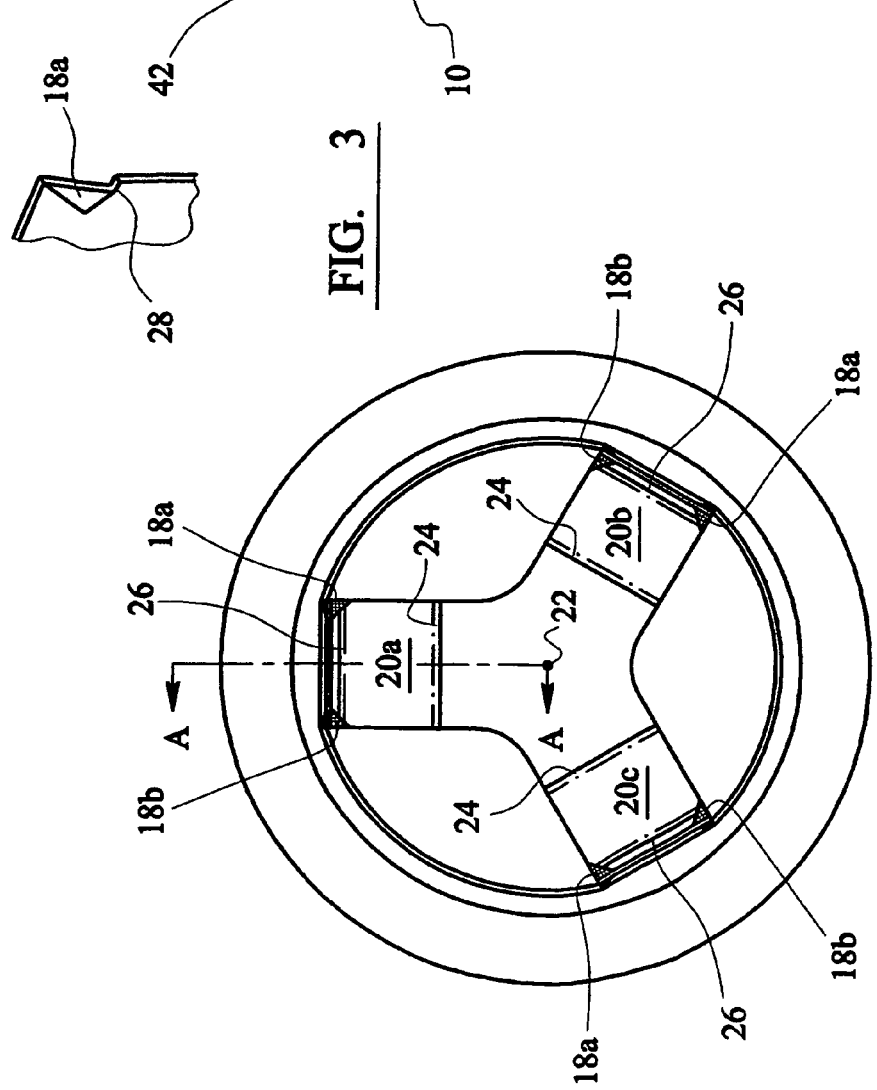
FIG. 2
FIG. 3

FIXING COVER

This invention relates to a fixing cover, and particularly, but not limited to, a heat resistant cover for a nut or bolt.

A current technique employed for building structures is to use a framework of steel beams. The beams are secured together by means of nut and bolt fixings. It is important that the nut and bolt fixings are protected from heat damage in the event of a fire. An existing method of protecting the nuts and bolts from excessive heat is to paint the nuts and bolts with an intumescent material. This material is fire resistant and to some extent prevents the failure of the nut and bolt joints in the event of a fire.

However, disadvantages arise with this method, because it is difficult to check visually that the correct type of intumescent material has been used. It is sometimes the case that the nuts and bolts are simply painted over with material of a similar colour to the correct intumescent material. This results in an extremely dangerous possibility that the joints of the steel structure could fail during a fire, leading to collapse of the building.

It is an object of the present invention to address the above mentioned disadvantages.

It is a further object of the present invention to provide means for providing heat protection to steel structure fixings and means for visually indicating that those fixings are protected.

It is a still further object of the invention to provide a protective cover for a joint fixing which in use allows for expansion of said joint fixing.

According to one aspect of the present invention a protective cover for a joint fixing comprises fixing gripping means and fire resistant cover means, wherein the gripping means are resiliently biased for gripping a fixing and for allowing expansion of a fixing during heating.

The fixing may be a bolt or a nut or a nut/bolt combination. The fixing may be a fixing for a structure made of metal beams.

The gripping means may be adapted to allow expansion of a fixing within the cover means. In which case the cover means may be substantially resistant to significant heat expansion of the fixing.

The cover means may be hollow. The cover means may have an opening in which to receive the fixing. The cover means may have a domed outer section, which may be opposite the opening in the cover means.

The cover means may have a stepped profile around said opening, preferably to receive a section of the fixing, preferably a washer.

The cover means may comprise a body section, preferably with a generally circular cross-section, having the opening at one end thereof. The cover means preferably also includes an end section which is preferably opposite the opening and preferably closes one end of the body section.

The gripping means may comprise a least one, preferably three, resilient arms. The or each resilient arm preferably extends down an interior face of the cover portion. The gripping means preferably comprises fixing gripping means on at least one arm.

The fixing gripping means preferably comprise at least one point directed away from the opening in the cover portion. The point is preferably a flange extending from said arm and at an angle to said arm. The fixing gripping means are preferably located at a lower end of said arm. There are preferably two points on each arm, preferably one at each side of said arm. The fixing gripping means preferably deter removal of the protective cover from a fixing by means of the or each point embedding in or being urged against said fixing.

The gripping means preferably comprises cover portion gripping means on at least one arm.

The cover portion gripping means preferably comprise at least one point directed towards the opening in the cover portion, preferably away from the fixing gripping means. The or each point is preferably a flange extending from said arm and at an angle to said arm. The fixing gripping means are preferably located towards an upper end of said arm. There are preferably two points on each arm, preferably one at each side of said arm. The cover portion gripping means preferably deter removal of the fixing gripping means from the cover means by means of the or each point embedding in or being urged against the cover means.

The direction in which the points of the cover portion gripping means face may permit the fixing gripping means to be pushed into the cover means but may resist the same being pulled therefrom.

Preferably, the fixing gripping means comprises three generally flat arms, preferably extending away from each other and generally equidistant or equispaced to each other. The arms preferably define three non-adjacent sides of a hexagon to receive a hexagonal nut/bolt head therein. The flat arms preferably extend across the closed end of the cover means and down the inner walls of the cover means.

According to another aspect of the present invention a method of protecting a joint fixing against excessive heat comprises attaching a protective cover to the joint fixing by means of gripping means of the cover which are resiliently biased to grip the joint fixing, said resilient bias of the gripping means also allowing for expansion of the joint fixing, and in which a fire resistant cover means covers the gripping means and the joint fixing to protect the same from excessive heat.

All of the features disclosed herein can be combined with any of the above aspects, in any combination.

A specific embodiment of the present embodiment of the present invention will now be described, by way of example, with reference to the accompanying drawings, in which:

FIG. 1 is a partially cut away side view of a nut/bolt head protection cap fitted to a bolt head;

FIG. 2 is a cross sectional view from above of the bolt head/nut cover; and

FIG. 3 is a partial side view of a flange of the bolt head/nut cover.

In this description a bolt head cover 10 may occasionally be referred to as a nut cover 10 and the two terms are interchangeable, since the cover referred to is suitable for being placed over a bolt head and a corresponding nut.

A bolt head cover 10 comprises an outer heat resistant portion 12 and an inner gripping portion 14. The bolt head cover 10 is arranged to be placed over a bolt head 16. The bolt head cover 10 is retained in position by means of the inner gripping portion 14 which grips the bolt head, with the gripping portion 14 being retained in the heat resistant portion 12 by means of flanges 18.

In more detail, the inner gripping portion 14 is made of a metal which can flex and has some spring characteristics to allow for elastic deformation of the arms 20a, b, c, as will be described below.

The gripping portion 14 comprises three arms 20a, 20b and 20c. The three arms extend away from a central point 22 such that they have equal angles therebetween. The arms are arranged at the equal angles so that the inner gripping portion can be placed over a hexagonal bolt head 16, thereby allowing three (non-adjacent) spaced faces of the hexagonal bolt head 16 to be gripped, as will be described below.

Each arm 20a, 20b and 20c, has a generally flat cross-section and extends horizontally away from the centre point 22 to a first shoulder 24 and then to a second shoulder 26. The shoulders 24 and 26 allow the gripping portion to generally follow an inner face of the heat resistant portion 12, as will be described below.

At the second shoulder 26 each arm extends vertically down an inner wall of the heat resistant portion 12.

The flanges 18 are located on this vertical section of each of the arms 20, 20b and 20c. A first flange 18a comprises a downwardly extending point 28, as can be seen in FIG. 3. The flange 18a extends outwardly towards the inner face of the heat resistant portion 12 and is arranged to engage said inner face of the heat resistant portion 12 to thereby hold the inner gripping portion 14 in position within the heat resistant portion 12. Because the flange 18 points downwards it prevents the gripping portion 14 being pulled out of the cover portion 12, but allows the gripping portion 14 to be pushed into the cover portion 12.

There is a corresponding flange 18b at the opposite side of each arm 20a, 20b, 20c (see FIG. 2), so that each arm has a downwardly extending point 28 at each side thereof. The spring quality of the metal from which the gripping portion is made allows the arms 20a, b, c and the flanges 18a and 18b to maintain pressure against the inner face of the heat resistant portion 12 to thereby maintain the gripping action.

At the base of each arm 20a, 20b, 20c there are flanges 30a and 30b, one at each side of each arm. These flanges extend inwards and have a point 32 which is directed upwards, in a similar fashion to which the points 28 on the flanges 18a and 18b point downwards. The purpose of the flanges 30a, 30b is to grip the bolt head 16 when the bolt head cover 10 is pushed onto the bolt head 16.

The heat resistant portion 12 comprises a cylindrical wall portion 34 and a domed upper portion 36. It is across the inside of the domed upper portion 36 that the upper parts of the arms 20a, 20b and 20c extend. The lower parts of the arms 20a, 20b and 20c extend down the inner walls of the cylindrical portion 34. There is a step 38 in the lower part of the cylindrical portion 34 which provides a recess for the bolt head cover 10 to be placed over a washer 40 as will be described below.

The heat resistant portion 12 is made of a heat resistant plastics material, such as a cirtam modified polyester dough moulding compound.

The bolt head cover 10 is assembled by pushing the inner gripping portion 14 into the interior of the heat resistant portion 12. The size of the inner gripping portion 14, is chosen so that the vertical sections of the arms extend laterally to be just within the inner walls of the cylindrical portion 34. The flanges 18a and 18b extend to a slightly greater diameter than the inner diameter of the cylindrical portion 34 so that when the inner gripping portion 14 is pushed into the heat resistant portion 12 the flanges 18a and 18b are flexed inwardly. The resilience of the arms 20a, b, c and the flanges 18a and 18b allows them to retain the inner gripping portion 14 within the heat resistant portion 12. Outward pressure on the inner gripping portion 14 will result in the points 28 of the flanges 18a and 18b digging into the material of the heat resistant portion 12 to further retain the inner gripping portion 14 in position.

Once assembled, either on site or before the bolt head cover 10 is despatched to a site, the bolt head cover 10 is simply pushed onto an exposed bolt head. The flanges 30a and 30b have a separation just less than the size of the bolt head 16, whereas the remainder of the vertical portion of the arms is just larger than the outer width of the bolt head 16, so that when pushed onto a bolt head 16 the arms 20a, b, c and the flanges 30a, 30b deform slightly and thereby grip the bolt head 16.

Should an attempt be made to pull the bolt head cover 10 from the bolt head 16 the points 32 of the flanges 30a and 30b will push into the bolt head 16 and deter outward movement of the bolt head cover 10 away from the bolt head 16. Thus, tension will be created between the flanges 30a and 30b and the flanges 18a to retain the bolt head cover 10 on the bolt head 16.

In the event of a fire, the heat resistant portion 12 ensures that the temperature inside the bolt head cover 10 is considerably lower than the temperature outside. In one test, the temperature inside the bolt head cover 10 has not passed 550° C. when the temperature outside the bolt head cover has been at 1000° C. for one hour.

In addition, the flexible nature of the gripping portion 14 allows the bolt head or nut to expand within the heat resistant portion 12 by causing flexure of the gripping portion 14. The expansion does not result in excessive outward pressure on the heat resistant portion 12 because of a gap between the arms 20a, b, c of the gripping portion 14 and the interior of the heat resistant portion 12.

In assembling the bolt head cover 10 it is possible to use adhesive to secure the lower face 42 of the heat resistant portion 12 to the surrounding material around the bolt head 16. It is not strictly necessary to use such adhesive, but additional safety may be provided. In use, it is envisaged that even without the additional adhesive intumescent material on the surrounding steel beam will rise up the sides of the heat resistant portion 12 to seal any gap which may be present between the lower face 42 of the heat resistant portion 12 and the section of the steel beam up to which it is pushed.

The bolt head 16 may optionally be covered with a corrosion inhibitor, such as a gel, Vaseline, grease or oil based grease. The inhibitor protects the bolt from the weather or other corrosive factors. In this situation the bolt cover 10 has the dual advantage of retaining the corrosion inhibitor and providing a less unsightly bolt head, as well as heat resistance.

In the example shown in the drawings, the heat resistant portion 12 has a dome with a thickness of approximately 4 mm to 6 mm. In this example the side walls have a thickness of approximately 11 to 13 mm, a height of approximately 28 to 30 mm, with the step 38 having a height of 5 mm and an incut width of approximately 3 mm. The overall external diameter of the cylindrical portion 34 may be approximately 57 mm. The inner gripping portion 14 may have arms 20a, 20b and 20c with a width of approximately 12 mm. The arms 20 are arranged to grip a bolt head 16 (or a nut) having a diameter of approximately 40 mm.

Of course other sizes of bolt head cover 10 are envisaged, to suit the particular size of a bolt head. Also, the heat resistant portion 12 may be thicker where more heat resistance is required.

A further possibility is to have one size of heat resistant portion 12 into which one of a variety of sizes of gripping portion 12 can fit. This allows the same heat resistant portion 12 to be used to cover a variety of sizes of bolt/nut, with only the gripping portion 12 changing in each case.

It is a significant advantage of the bolt head cover 10 described above that it is self supporting and can be simply pushed on to a bolt head 16, with no surrounding material necessary to support the bolt head cover, because of the gripping portion 14.

Also advantageous is the ability to accommodate expansion of a bolt on which the cover is placed.

Also, the bolt head cover 10 has the significant advantage of being readily visible, even from quite some distance, and that a protective heat resistant cover has been secured to a bolt head 16. The bolt head cover provided avoids the possibility that any incorrect intumescent material could be painted onto a bolt head, giving the impression that the bolt head is heat protected, when in fact it is not.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A non-removable protective cover for a joint fixing on a steel structure comprises fixing gripping means for gripping the fixing on the steel structure and heat resistant, fire resistant cover means for covering the fixing, wherein the gripping means are resiliently biased for gripping the fixing and for allowing expansion of the fixing during heating, the fixing gripping means comprising at least one first resilient arm comprising an end point directed away from an opening in the cover and radially inwardly toward the fixing, and at least one second resilient arm comprising an end point directed towards the opening in the cover and radially inwardly away from the fixing, wherein the end point of the first resilient arm is located closer to the opening than is the end point of the second resilient arm.

2. A non-removable protective cover as claimed in claim 1, in which the fixing is a bolt or a nut or a nut/bolt combination for a structure made of metal beams.

3. A non-removable protective cover as claimed in claim 2, in which the gripping means are adapted to allow expansion of the fixing within the cover means.

4. A non-removable protective cover as claimed in claim 1, in which the gripping means are adapted to allow expansion of the fixing within the cover means.

5. A non-removable protective cover as claimed in claim 1, in which the cover means have a stepped profile around the opening in which to receive the fixing.

6. A non-removable protective cover as claimed in claim 1, in which the or each resilient arm extends down an interior face of the cover means.

7. A non-removable protective cover as claimed in claim 1, in which the gripping means deter removal of the protective cover from the fixing by means of the or each point embedding in or being urged against said fixing.

8. A non-removable protective cover as claimed in claim 1, in which the gripping means comprises cover gripping means, the cover gripping means comprising the at least one second resilient arm.

9. A non-removable protective cover as claimed in claim 1, in which the gripping means comprises three generally flat arms.

10. A non-removable protective cover as claimed in claim 9, in which the arms define three non-adjacent sides of a hexagon to receive a hexagonal nut/bolt head therein.

11. A method of protecting a joint fixing against excessive heat comprises attaching a non-removable protective cover to the joint fixing by fixing gripping means for gripping the joint fixing, which gripping means are resiliently biased to grip the joint fixing, said resilient bias of the gripping means also allowing for expansion of the joint fixing, and in which a heat resistant, fire resistant cover means for covering the joint fixing covers the gripping means and the joint fixing to protect the same from excessive heat, wherein the fixing gripping means comprises at least one first resilient arm comprising an end point directed away from an opening in the cover and radially inwardly toward the fixing, and at least one second resilient arm comprising an end point directed towards the opening in the cover and radially inwardly away from the fixing, wherein the end point of the first resilient arm is located closer to the opening than is the end point of the second resilient arm.

* * * * *